United States Patent [19]

Wolf

[11] Patent Number: 5,014,197
[45] Date of Patent: May 7, 1991

[54] ASSIGNMENT OF FILES TO STORAGE DEVICE USING MACRO AND MICRO PROGRAMMING MODEL WHICH OPTIMIZED PERFORMANCE OF INPUT/OUTPUT SUBSYSTEM

[75] Inventor: Joel L. Wolf, Goldens Bridge, N.Y.

[73] Assignee: International Business Machines Corporation, Armonk, N.Y.

[21] Appl. No.: 240,029

[22] Filed: Sep. 2, 1988

[51] Int. Cl.$^5$ .......................... G06F 9/22; G06F 13/10
[52] U.S. Cl. ...................... 364/200; 364/245.5;
364/245.6; 364/282.2; 364/282.3; 364/282.4;
364/283.1; 364/283.2; 364/283.3; 364/283.4;
364/949.1; 364/967; 364/967.4; 364/967.5;
364/968.1

[58] Field of Search ... 364/200 MS File, 900 MS File

[56] References Cited

U.S. PATENT DOCUMENTS 4,542,458 9/1985 Kitajima et al. ..................... 364/200
4,885,686 12/1989 Vanderbei ............................ 364/402

OTHER PUBLICATIONS

Garfinkel et al.; "Integer Programming"; a Wiley-Interscience Publication; 1972, Chapter 9, "Approximate Methods", pp. 324–325.
Foster et al.; "File Assignment in Computer Network"; North-Holland Publishing Company; Feb. 3–5, 1981, pp. 341–349.
Lawrence Gene Jones; "File Assignment in a Central Server Computer Network", Vanderbilt University Nashville, Tennessee, 1979, pp. 1–162.
Chu; "Optimal File Allocation in a Multiple Computer System"; IEEE Transaction on Computer, vol. C-18, No. 10, Oct. 1969, pp. 885–889.
Rakes et al.; "A Heuristic Approxmiation for Reducing Problem Size in Network File Allocation Models", Comput & Ops. Res. vol. 11, No. 4, pp. 387–395.
Mahmoud et al.; "Optimal Allocation of Resources in Distributed Information Networks", Mar. 1976, pp. 66–78.
Trividi et al.; "Optimal Selection of CPU Speed, Device Capacities and File Assignments", Journal of the ACM vol. 27, No. 3, Jul. 1980, pp. 457–473.
Segall, "Dynamic File Assignment in a Computer Network", IEEE Transactions on Automatic Control, vol. AC-21, No. 2, Apr. 1976, pp. 161–173.
Todd et al., "An Extension of Kamarkar's Algorithm for Linear Programmaing Using Dual Variables", Cornell University Colleges of Engineering, Technical Report No. 648, pp. 1–32, Jan. 1985.

Primary Examiner—David Y. Eng
Assistant Examiner—Krisna Lim
Attorney, Agent, or Firm—Whitham & Marhoefer

[57] ABSTRACT

A practical mathematical algorithm is used to solve the so-called "File Assignment Problem" (FAP). The FAP is partitioned into two sequential optimization problems, called the macro model and the micro model. The macro model is solved by a Non-Linear Programming Model (NLPM) and a Queuing Network Model (QNM). The NLPM takes as input detailed information on the computer system configuration and performance characteristics down through the DASD level, and, using the QNM as its objective function evaluator, determines the "optimal" DASD relative access rates as output. The micro model is solved by a Binary Linear Programming Model (BLPM), although the QNM is also involved to help determine the BLPM stopping criteria. The input to the micro model consists basically of the output from the macro model, together with statistics on the access rates of the various files in the computer system. The output from the optimization is an "optimal" assignment of files to DASDs. The micro model algorithm can be utilized in either an unlimited file movement mode or a limited file movement mode, the former being used when the computer system undergoes a major reconfiguration while the latter is used on a once per week basis. The BLPM is solved by a "neighborhood escape" type heuristic. The procedure provides a real-world, practical solution to the FAP resulting in significant increases in performance.

6 Claims, 6 Drawing Sheets

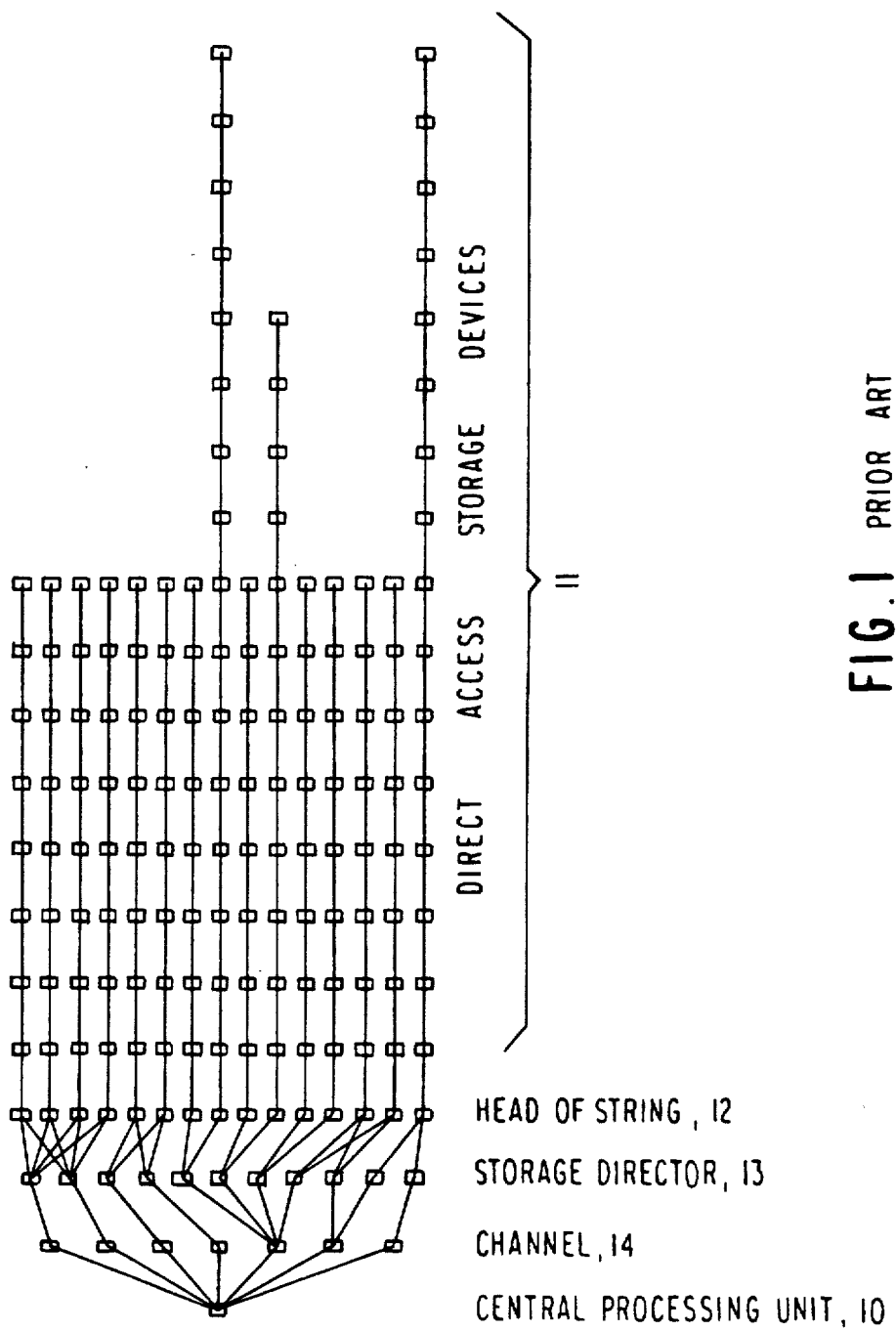

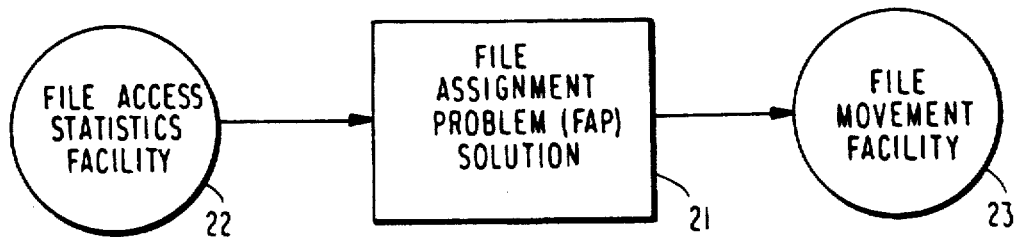
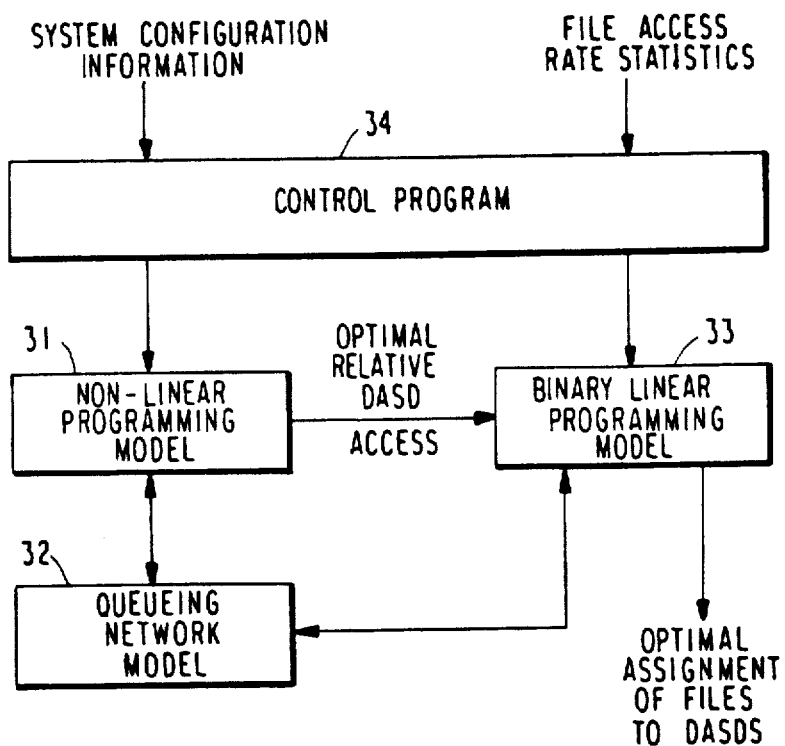
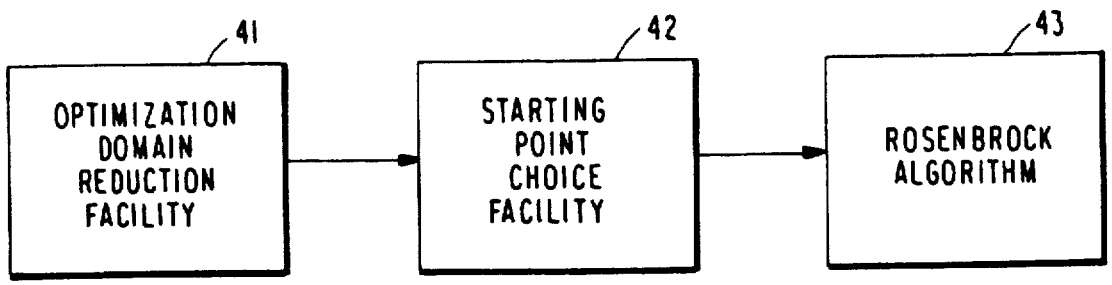

LEGEND
PAO: PERFORMANCE, AVAILABILITY AND OWNERSHIP

ASSIGNMENT OF FILES TO STORAGE DEVICE USING MACRO AND MICRO PROGRAMMING MODEL WHICH OPTIMIZED PERFORMANCE OF INPUT/OUTPUT SUBSYSTEM

BACKGROUND OF THE INVENTION

1. Field of the Invention

The present invention generally relates to improving the performance of computer input/output (I/O) subsystems and, more particularly, to a practical solution to the so-called "File Assignment Problem" (FAP).

2. Description of the Prior Art

The FAP can be defined as follows: Suppose that one is given information on a computer system, including the configuration and performance characteristics of the I/O subsystem down through the Direct Access Storage Device (DASD) level. Suppose also that one is given statistics gathered on the access rates of the files (or some similar atomic unit of physical data) stored on those DASDs. Then a solution to the FAP is an assignment of the files to the DASDs which optimizes performance of the I/O subsystem over some reasonable period of time, while meeting appropriate system and user imposed constraints.

FIG. 1 shows an example of a typical computer I/O subsystem of contemporary design. Between the central processing unit (CPU) 10, which makes requests to read and write data, and the DASDs 11, on which the data is stored, is a hierarchy of shared components of varying intelligence. Collections of DASD 11 are attached serially to their (single) head of string (HOS) 12. These HOSs, in turn, are attached to one or more storage directors 13 of a controller. The storage directors are attached to one or more channels 14. Finally, the channels are attached to their single CPU 10 or a tightly coupled CPU complex. There will generally exist several paths connecting a given CPU to a given DASD. Additionally, some of the controllers may contain caches. Large computer systems may contain hundreds of DASDs.

The major motivation for solving the FAP is performance, and it can be summarized in the following three points:

(1) There is a clear and non-trivial performance gain to be had by achieving an optimally balanced file assignment as compared to a non-optimal assignment. Typical savings are in the range of 20 to 25%, in terms of mean I/O subsystem response time. The fact that I/O is a bottleneck to current computer system performance makes this observation all the more important.

(2) This non-optimal "skew" is not at all uncommon. For example, D. Hunter in "Modeling real DASD configurations", IBM Research Report RC 8606 (1980), has pointed out that even in "reasonably well-tuned systems" consisting of between 40 and 250 DASDs, it is "not uncommon that 90% of the non-paging DASD I/O requests go to 20% of the connected DASDs, or for 33% to go to just 3 of the connected DASDs".

(3) The FAP does not, in general, admit trivial solutions, and intuitive heuristics may very well lead to poor solutions. In one study by L. W. Dowdy and D. V. Foster entitled "Comparative models of the File Assignment Problem", ACM Computer Surveys, vol. 14, no. 2, (1982), "eight researchers with doctorates in computer science studied" a prototypical FAP, and "gave eyeball solutions". These solutions averaged "4% below an average randomly chosen file assignment, and 36% below the optimal file assignment". Thus, a more sophisticated approach to the FAP would seem to be essential.

Given this state of affairs, it should not be surprising that the computer science literature is filled with papers on the FAP, and in fact this is the case. In addition to the survey paper of Dowdy and Foster, see for example B. W. Wah, "File Placement on Distributed Computer System", Computer (1984) and U.S. Pat. No. 4,542,458 to Kitajima et al. Unfortunately, these are primarily of theoretical interest, and a real-world, practical solution to the FAP has been elusive.

SUMMARY OF THE INVENTION

It is therefore a principle object of the present invention to provide a truly practical, real-world solution to the FAP.

According to the invention, there is provided an algorithm which determines the optimal relative DASD access rates; i.e., the optimal "skew". This algorithm also determines the optimal assignment of files to DASD in order to realize the optimal skew. The invention further provides an appropriately detailed queuing network model (QNM), without which no FAP solution can be realistic enough to be practical. The invention has the capability to handle a wide variety of possible constraints which might be required by computer system users. No actual computer system would ever implement an FAP solution algorithm without such real-world constraints. Further, the invention provides the ability to run the algorithm in "limited movement" mode, moving only a small number of files to "tune up" the existing file assignment. Due to the cost and time involved in actual file movement, it would not be feasible for a computer system to make wholesale revisions to its file assignments on a regular basis. However, changes in file access rates statistics, new files, discarded files and the like will make periodic file assignment adjustments necessary.

None of the previously mentioned FAP solutions meet all of these criteria. In fact, many assume that the optimal skew is somehow known, and some do not partition the algorithm into the sequence of two optimization problems as indicated above. This partitioning reduces considerably the computational expense of finding an FAP solution and does not appear to harm the overall quality of the solution. None of the prior solutions have QNMs nearly as detailed as that of this invention. None have constraints nearly as complete as those of this invention. And none have the limited movement mode capability of this invention.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 1 is a generalized block diagram of a prior art computer, I/O subsystem;

FIG. 2 is a functional block diagram showing the general environment in which the FAP solution according to the invention resides;

FIG. 3 is a block diagram of the major components of the invention;

FIG. 4 is a high level flow diagram of the non-linear programming model according to the invention;

DETAILED DESCRIPTION OF A PREFERRED EMBODIMENT OF THE INVENTION

Overview

Figures 5, 6:
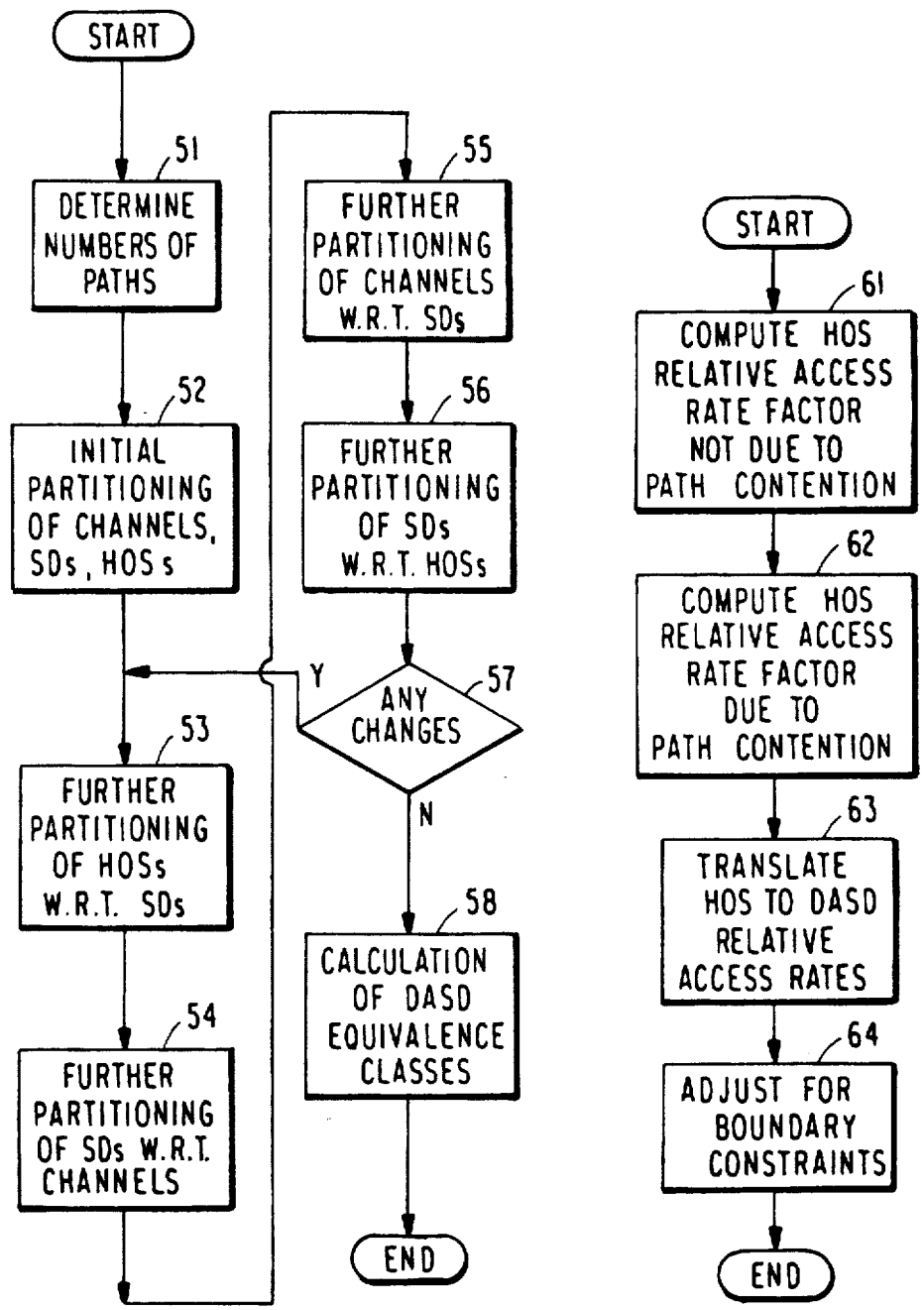
FIG. 5 is a flow diagram of the partitioning and iterative processes which form the optimization domain reduction facility shown in FIG. 4.
FIG. 6 is a flow diagram of the process which implements the starting point choice facility shown in FIG. 4.

FIG. 2 depicts the general environment in which the solution 21 to the FAP according to the invention resides. On the front-end 22, one needs the capability to keep careful track of the file access statistics and such. On the back-end 23, one needs to have a safe, efficient, and preferably automated way of actually moving files form DASD to DASD. Both the front and back-ends are not included within the scope of this invention.

The FAP solution algorithm according to the invention partitions the problem into a sequence of two optimization problems. This can be done quite naturally, and reduces considerably the computational complexity of the overall problem. These optimization models are referred to as macro and micro models, respectively.

The macro model is solved by the two boxes shown on the left-hand side of FIG. 3, namely the Non-Linear Programming Model (NLPM) 31 and the QNM 32. Basically, the NLPM takes as input detailed information on the computer system configuration and performance characteristics down through the DASD level, and, using the QNM as its objective function evaluator, determines the optimal DASD relative access rates as output. The objective function measures the mean I/O subsystem response time (IORESPONSE) over all DASDs in the computer system. The user can impose constraints to account for minimum and maximum allowable relative DASD access rates. In particular, this includes the potential "fixing" of certain relative DASD access rates, which is used, for example, when it is known that the data on a particular DASD may not be touched. The complexity of the objective function dictates that a rather inefficient non-linear optimization technique be used. In this invention, the so-called Rosenbrock Algorithm is employed to solve the NLPM. The design of the macro model is such that it will not need to be run frequently. One only needs to run the macro model when the computer system configuration changes.

The micro model is solved by the box shown on the right-hand side of FIG. 3, namely the Binary Linear Programming Model (BLPM) 33, although the QNM is also involved to help determine the BLPM stopping criteria. The input to the micro model consists basically of the input and output from the macro model, together with statistics on the access rates of the various files in the computer system. The objective function measures, for each DASD, the distance between the optimal relative access rates as computed by the macro model and the sum of the individual file access rates for files assigned to that DASD, and then sums across all DASDs. The user can impose constraints which either assign or restrict assignment of certain files to certain DASDs, usually for performance, availability or DASD "ownership" reasons. "Pools" of DASDs can be created. Files residing in one DASD pool may be moved about freely within that pool but cannot be moved to another pool. Similarly, it is possible to impose "mutual exclusion" type restrictions on pairs of files; e.g., the files are required to be placed on separate DASDs. Other constraints guard against DASDs being overloaded in terms of either physical capacity or file access rate burstiness, the latter being a measure of the (95th percentile) tail of the access rate distribution for a given file. The BLPM solution approach employed by this invention may be classified as a member of the "neighborhood escape" family of heuristics.

The micro model can be run in either of two modes, "unlimited" and "limited". In the "unlimited" mode, the optimizer has essentially a free hand, and (aside from user-imposed constraints) can move files wherever it sees fit to do so. This mode is appropriate when the computer system undergoes a major reconfiguration, or perhaps when the invention is first implemented. In the "limited" mode, the user can specify the maximum number of files that can be moved (from their current DASD). This "tweak" mode will be the more common one, perhaps running on a once per week basis. The idea is to take a reasonably acceptable existing assignment and "true it up" to account for changes in file access rate statistics, new files, discarded files and the like.

The other box in FIG. 3 is the Control Program (CP) 34. This box serves as a "trigger" for the macro and micro models and also as an interface to both the front and back-end of the invention.

In the following discussion, mathematical set notation is used. Specifically, $\exists$ means "there exists", $\epsilon$ means "is an element of", and $\notin$ means "is not an element of".

Macro Model Inputs

The macro model input parameters can be grouped into several categories, as follows:

General Notation

Let NCPU denote the number of CPU complexes in the system.

Let NCHANNEL denote the number of channels in the system.

Let NSD denote the number of storage directors in the system.

Let NHOS denote the number of heads of string in the system.

Let NDASD denote the number of DASDs in the system.

System Topology

Let $A_{CPU,CH} = \{(i,j)\epsilon\{1, \ldots, NCPU\} \times \{1, \ldots, NCHANNEL\} | \text{channel } j \text{ is dedicated to CPU } i\}$. For convenience, given $j\epsilon\{1, \ldots, NCHANNEL\}$, let $CPU_j$ denote the CPU for channel j, that is, the (unique) $i\epsilon\{1, \ldots, NCPU\}$ for which $(i,j)\epsilon A_{CPU,CH}$.

Let $A_{CH,SD} = \{(i,j)\epsilon\{1, \ldots, NCHANNEL\} \times \{1, \ldots, NSD\} | \exists \text{ a path from channel i to storage director j}\}$.

Let $A_{SD,HOS} = \{(i,j)\epsilon\{1, \ldots, NSD\} \times \{1, \ldots, NHOS\} | \exists \text{ a path from storage director i to HOS j}\}$.

Let $A_{HOS,DASD} = \{(i,j)\epsilon\{1, \ldots, NHOS\} \times \{1, \ldots, NDASD\{|DASD j \text{ is contained in the string from HOS i}\}$. For convenience, given $j\epsilon\{1, \ldots, NDASD\}$, let $HOS_j$ denote the head of string for DASD j, that is, the (unique) $i\epsilon\{1, \ldots, NHOS\}$ for which $(i,j)\epsilon A_{HOS,DASD}$.

I/O Subsystem Characteristics

The user may choose either a static or dynamic reconnect algorithm. Let $$SDSWITCH = \begin{cases} 0 \text{ if the system uses a static algorithm, and} \\ 1 \text{ if the system uses a dynamic algorithm.} \end{cases}$$

For each i, i=1, ..., NDASD, let $SEEK_i$ denote the mean time required by DASD i to position the arm of the DASD to the correct cylinder.

For each i, i=1, ..., NDASD, let $LATENCY_i$ denote the mean time required by DASD i for the desired sector to rotate under the DASD heads.

For each i, i=1, ..., NDASD, let $SEARCH_i$ denote the mean time required by DASD i for searching the sector for the desired data after the DASD has gained a reconnection path.

For each i, i=1, ..., NDASD, let $TRANSFER_i$ denote the mean time required by DASD i to transfer the required data.

For each i, i=1, ..., NDASD, let $ROTATION_i$ denote the time required for full rotation by DASD i.

Let CACHE = {i∈{1, ..., NDASD} | DASD i uses a cached controller}.

For DASD i∈CACHE, let $OFFC_i$ denote that portion of the total activity for DASD i which does not attempt to use the cache in the controller.

For DASD i∈CACHE, let $READ_i$ denote the read ratio for data on DASD i. For that portion of the total activity for DASD i which attempts to use the cache in the controller, this is the mean number of reads divided by the sum of the mean number of reads and the mean number of writes.

For DASD i∈CACHE, let $HIT_i$ denote the hit ratio for data on DASD i. For that portion of the total activity for DASD i which attempts to use the cache in the controller, this is the mean number of cache hits divided by the sum of the mean number of cache hits and the mean number of cache misses.

For DASD i∈CACHE, let $SEARCHC_i$ denote the mean time required by (the cached controller of) DASD i to search the cache on a read hit.

For DASD i∈CACHE, let $TRANSFERC_i$ denote the mean time required by (the cached controller of) DASD i to transfer the required data from the cache on a read hit.

Label the five major types of activity which take place in a cached environment as follows: Activity type 1 is one which does not attempt to use the cache in the controller. Activity type 2 is a cache read hit. Activity type 3 is a cache read miss. Activity type 4 is a cache write hit. Activity type 5 is a cache write miss. The sum of the probabilities of each of the five types of activity is 1. Let i∈CACHE and j∈{1,2,3,4,5}. Define $OVERDASD_{i,j}$ to be the time overhead at the DASD level for DASD i when experiencing activity type j. Define $OVERHOS_{i,j}$ to be the time overhead at the head of string level for DASD i when experiencing activity type j. Define $OVERSD_{i,j}$ to be the time overhead at the storage director level for DASD i when experiencing activity type j. Define $OVERCH_{i,j}$ to be the time overhead at the channel level for DASD i when experiencing activity type j. Note that $OVERDASD_{i,2}$ and $OVERHOS_{i,2}$ will be 0 by definition.

For DASD i∉CACHE, define $OVERDASD_{i,j}$, $OVERHOS_{i,j}$, $OVERSD_{i,j}$, and $OVERCH_{i,j}$ similarly.

(Note that activity type 1 makes sense in a non-cached environment, but activity types 2 through 5 do not.)

System Throughput

Let $THRUPUT_i$ denote the total access rate to the I/O subsystem from CPU i, i∈{1, ..., NCPU}.

Boundary Constraints

For each i, i=1, ..., NDASD, and each j, j=1, ..., NCPU, let $SMALL_{i,j}$ denote the minimum allowable relative access rate from CPU j for DASD i.

For each i, i=1, ..., NDASD, and each j, j=1, ..., NCPU, let $BIG_{i,j}$ denote the maximum allowable relative access rate from CPU j for DASD i.

Stopping Criteria

The stopping criteria are determined by the input of $N_{ROSENBROCK}$ and $\epsilon_{ROSENBROCK}$ according to the following rule: If $RESULT_k$ denotes the mean I/O subsystem response time computed by the Rosenbrock algorithm at the end of its kth stage, the stop whenever $$\max_{0 \leq i < N_{ROSENBROCK}} RESULT_{k-i} -$$

$$\min_{0 \leq i < N_{ROSENBROCK}} RESULT_{k-i} < \epsilon_{ROSENBROCK}.$$

Non-Linear Programming Model

The NLPM solved by the invention uses the input given above. As output, it gives the optimal relative access rates $\rho_{i,j}$ for each DASD i and each CPU j in the system, subject to the constraints imposed. The objective function measures the mean response time over all DASDs in the I/O subsystem and is evaluated by means of the QNM described below.

Reference is now made to FIGS. 4, 5 and 6. In FIG. 4, the first block 41 relates to the optimization domain reduction facility. In order to reduce the dimensionality of the optimization domain space (and thus reduce the complexity of the optimization problem), an elaborate partitioning of the DASD into equivalence classes is performed. Basically, to be in the same equivalence class, two DASDs will have to look completely interchangeable to the QNM.

The process begins in FIG. 5 at function block 51 where the number of paths in the I/O subsystem are determined. This begins the process of partitioning into equivalence classes. At this point in the procedure, a given CPU is fixed and attention is restricted to those paths between adjoining components which are segments of a path back to that CPU. For each channel, the total number of such paths back to different storage directors is determined. For each storage director, the total number of such paths back to different channels is determined. Also, for each storage director, the total number of such paths back to different heads of string is determined. For each head of string, the total number of such paths back to different storage directors is determined. These calculations make use, of course, of the system topology parameters. The process is repeated for each CPU in the system.

The procedure next goes to function block 52 where the channels are partitioned into initial equivalence classes by requiring that the number of storage director paths for their CPU be equal. The storage directors are partitioned into initial equivalence classes by requiring that the number of channel paths for each CPU be equal and the number of head of string paths for each CPU be equal. The heads of string are partitioned into initial equivalence classes by requiring that the number of storage director paths for each CPU be equal, that the number of DASDs in their strings be equal, and that there exist a pairwise matching of their respective DASDs in the sense that every I/O subsystem component characteristic parameter and every boundary constraint parameter be equal.

At this point in the procedure, an iterative process begins, looping over all the CPUs. First, in function block 53, the head of string equivalence classes are further partitioned by requiring that for two levels of string to be in the same equivalence classes, there must exist a pairwise matching of their connected storage directors in the sense that the corresponding storage directors be in the same equivalence class. Next, in function block 54, the same procedure is carried out for storage director equivalence classes with respect to channels. Then, in block 55, the same procedure is carried out for channel equivalence classes with respect to storage directors. Finally, in function block 56 the same procedure is carried out for storage director equivalence classes with respect to heads of string. In decision block 57, the process loops back to function block 53 until one complete iteration yields no further change in equivalence classes. Then, in function block 58, the DASD equivalence classes are computed as follows: Two DASDs will be in the same equivalence class if they have equivalent heads of string and completely identical I/O subsystem component and boundary constraint characteristics.

The next block 42 in FIG. 4 relates to the starting point choice facility. A reasonably good starting point is chosen by the procedure shown in FIG. 6. The process begins in function block 61 where, for a given head of string, the average service time, not including path contention, is determined for all DASDs contained in the string. The exact formula is not reproduced here but involves the seek, latency, search, transfer and overhead times. Since the DASDs contained in a head of string are, as a rule, all the same type, this average will generally be identical to the average service time not including path contention for any of the DASDs contained in the string. for a given CPU, 75% of the initial relative access rates to each head of string connected to that CPU is estimated to be proportional to the corresponding average service rates for the heads of string, or inversely proportional to the average service times. (The value 75% is empirical and is based on the relative importance to the overall service time of the non-contention component.)

Next, in function block 62, the number of paths back to each CPU is computed for a given head of string. This is done, of course, by using system topology parameters. For a given CPU, 25% of the initial relative access rates to each head of string is estimated to be proportional to these numbers. Then, in function block 63, the head of string relative access rates to the DASDs within the string is apportioned by dividing up the total head of sting rate according to the inverse of the "speed potential" of each DASD determined in function block 61. Generally, this means dividing the head of string rate by the number of DASDs within the string. By its nature, the assignment obtained in this manner, which is denoted by $\{\rho_{i,j}|i\epsilon\{1, \ldots ,NDASD\},j\epsilon\{1, \ldots ,NCPU\}\}$, respects the DASD equivalence classes and so can be taken to correspond to the starting point for the Rosenbrock algorithm in block 43 of FIG. 4, except that one must check the boundary constraints.

In function block 64, the starting point is adjusted to account for boundary constraints. If a given $\rho_{i,j}$ falls below $SMALL_{i,j}$, for example, then $\rho_{k,j}$ is set equal to $SMALL_{i,j}$ for all DASDs k within the equivalence class of i, while all DASDs l in other equivalence classes for which $\rho_{l,j} > SMALL_{l,j}$ are lowered in a uniform fashion towards (but not past) their lower limits. The reverse procedure is done for a $_{i,j}$ which falls above $BIG_{i,j}$. The process continues iteratively until all boundary conditions are satisfied (or it is discovered that the problem is infeasible because of the boundary constraints, presumably an unlikely event). The final assignment $\{\rho_{i,j}i\epsilon\{1, \ldots ,NDASD, j\epsilon\{1, \ldots ,NCPU\}\}$ corresponds to the starting point $x_0$ of the Rosenbrock algorithm.

The actual optimization is performed using a Rosenbrock Algorithm in block 43 of FIG. 4. The boundary constraints are handled by the usual technique, namely imposition of a penalty function. For further details on the Rosenbrock Algorithm, see, for example, *Nonlinear Programming* by M. S. Bazaraa and C. M. Shetty published by John Wiley and Sons (1979).

Queuing Network Model

The objective function evaluator employed in this invention is an open, multi-class, product-form QNM, and it is related to the QNM described in *Computer System Analysis Using Queuing Network Models*, by E. D. Lazowska, J. Zahorjan, G. S. Graham, and K. C. Sevick published by Prentice Hall (1984). For convenience, the symbol→denotes the existence of a subpath between two successive members in the I/O subsystem hierarchy. Thus, $HOS_i\rightarrow i$. Also, $j\rightarrow HOS_i$ whenever $(j,HOS_i)\epsilon A_{CH,SD}$. Finally, $CPU_k\rightarrow k$.

Figure 7:
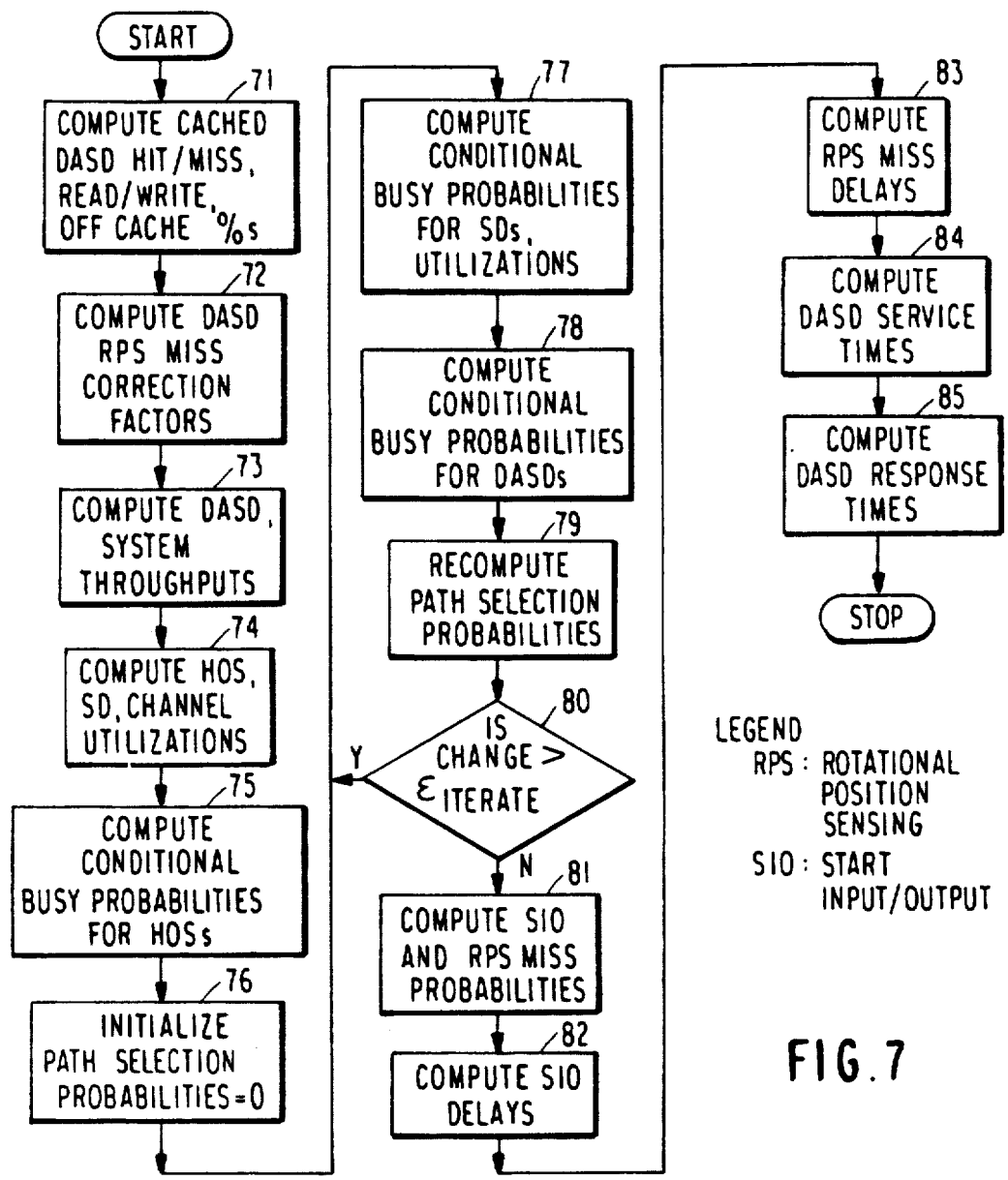
FIG. 7 is a flow diagram of the Queuing Network Model (QNM) according to the invention.

The following discussion relates to the flow diagram shown in FIG. 7. In function block 71, given DASD i$\epsilon$CACHE, the fraction of time DASD i experiences activity of type j, j = 1, . . . , 5 is computed as follows:

$FRACTION_{i,1} = OFFC_i$.
$FRACTION_{i,2} = (1 - OFFC_i)(READ_i)(HIT_i)$.
$FRACTION_{i,3} = (1 - OFFC_i)(READ_i)(1 - HIT_i)$.
$FRACTION_{i,4} = (1 - OFFC_i)(1 - READ_i)(HIT_i)$.
$FRACTION_{i,5} = (1 - OFFC_i)(1 - READ_i)(1 - HIT_i)$.

In function block 72, given DASD i, the correction factor for RPS (rotational position sensing) miss delay is computed as follows:

$$CORRECTOR_i = \frac{1}{1 - \exp\left[\frac{-1}{NDASD - 1} \sum_{\substack{j=1 \\ j\neq i}}^{NDASD} \frac{ROTATION_j}{TRANSFER_j}\right]}$$

In function block 73, given DASD i, the throughput at DASD i due to CPU j is given by $THRUDASD_{i,j} = \rho_{i,j}THRUPUT_j$. The total throughput at DASD i is given by $$TTHRUDASD_i = \sum_{i=1}^{NCPU} THRUDASD_{ij}.$$

and the total throughput for the entire system is given by $$TTHRUPUT = \sum_{i=1}^{NDASAD} TTHRUDASD_i.$$

In function block 74, given DASD i ∉ CACHE, the utilization of the head of string $HOS_i$ due to data transfer from DASD i is given by $$UTRANSHOS_i = TTHRUDASD_i[SEARCH_i + TRANSFER_i + OVERHOS_i].$$

The sum of the utilizations of the storage directors due to data transfer from a non-cached DASD i is given by $$UTRANSSD_i = TTHRUDASD_i[SEARCH_i + TRANSFER_i + OVERSD_i].$$

The sum of the utilizations of the channels due to data transfer from a non-cached DASD i is given by $$UTRANSCH_i = TTHRUDASD_i[SEARCH_i + TRANSFER_i + OVERCH_i].$$

Given DASD i∈CACHE, the utilization of the Head of String $HOS_i$ due to data transfer from DASD i is given by $$UTRANSHOS_i = TTHRUDASD_i \left[ \sum_{\substack{j=1 \\ j \neq 2}}^{5} [FRACTION_{i,j}[SEARCH_i + TRANSFER_i + OVERHOS_{i,j}]] \right].$$

The sum of the utilizations of the storage directors due to data transfer from a cached DASD i is given by $$UTRANSSD_i = TTHRUDASD_i \left[ FRACTION_{i,1}[SEARCH_i + TRANSFER_i + OVERSD_{i,1}] + FRACTION_{i,2}[SEARCHC_i + TRANSFERC_i + OVERSD_{i,2}] + \sum_{j=3}^{5} [FRACTION_{i,j}[SEARCH_i + TRANSFER_i + OVERSD_{i,j}]] \right].$$

The sum of the utilizations of the channels due to data transfer from a cached DASD i is given by $$UTRANSCH_i = TTHRUDASD_i \left[ FRACTION_{i,1}[SEARCH_i + TRANSFER_i + OVERCH_{i,1}] + FRACTION_{i,2}[SEARCHC_i + TRANSFERC_i + OVERCH_{i,2}] + \sum_{j=3}^{5} [FRACTION_{i,j}[SEARCH_i + TRANSFER_i + OVERCH_{i,j}]] \right].$$

In function block 75, given DASD i, the utilization of the head of string $HOS_i$ due to requests routed through DASDs other than i is computed as follows:

$$UHOSOTHER_i = \sum_{\substack{j=i \\ HOS_j = HOS_i \\ j \neq i}}^{NDASD} UTRANSHOS_j.$$

Next, the conditional probability of $HOS_i$ being busy, given that DASD i is free, is computed as follows:

$$prob_i(HOS_i busy) = \frac{UHOSOTHER_i}{1 - UTRANSHOS_i}.$$

In function block 76, for each DASD i, head of string $HOS_i$, storage director j satisfying j→$HOS_i$, and channel k satisfying k→j, initialize probi(path(k→j→$HOS_i$)-selected) to be 0. This variable will represent the conditional probability that a connect or reconnect request associated with DASD i leads to selection of the subpath k→j→$HOS_i$, given that DASD i is free (i.e., ready to transmit or receive).

In function block 77, given DASD i, head of string $HOS_i$, and storage director j satisfying j $HOS_i$, the utilization of j due to requests routed through heads of string other than $HOS_i$ is computer as follows:

$$USDOTHER_{i,j} =$$

$$\sum_{\substack{k=i \\ k \to j}}^{NCHANNEL} \sum_{\substack{i=1 \\ j \to HOS_1 \\ HOS_1 \neq HOS_1}}^{NDASD} UTRANSSD_1 prob_1(path(k \to j \to HOS_1)selected).$$

Compute . . .

$$prob_i(HOS_i \text{ free \& storage director } j \text{ busy}) = \frac{USDOTHER_{i,j}}{1 - UTRANSSD_i}.$$

This variable will represent the conditional probability of storage director j being busy and HOSi being free, given that DASD i is free. Given DASD i, head of string $HOS_i$, storage director j satisfying j→$HOS_i$, and channel k satisfying k→j, the utilization of k due to requests routed through heads of string other than $HOS_i$ and storage directors other than j is computed as follows:

$$UCHOTHER_{i,j,k} =$$

$$\sum_{\substack{l=1 \\ K \to l \\ l \neq j}}^{NSD} \sum_{\substack{m=1 \\ l \to HOS_m \\ HOS_m \neq HOS_i}}^{NDASD} UTRANSCH_m prob_m(path(k \to$$

-continued $$l \rightarrow HOS_m)\text{selected}).$$

Compute...

$prob_i(HOS_i \text{ free \& storage director } j \text{ free \& channel } k \text{ busy}) =$ $$\frac{UCHOTHER_{i,j,k}}{1 - UTRANSCH_i}.$$

This variable will represent the conditional probability of channel k being busy, storage director j being free, and $HOS_i$ being free, given that DASD i is free.

Next, in function block 78, the conditional probability that a connect or reconnect request associated with DASD i finds an element in the subpath $k \rightarrow j \rightarrow HOS_i$ busy, given that DASD i is free is computed as follows:

$prob_i[\text{path}(k \rightarrow j \rightarrow HOS_i)\text{busy}] = prob_i(HOS_i \text{ busy}) +$ $prob_i(HOS_i \text{ free \& storage director } j \text{ busy}) +$ $prob_i(HOS_i \text{ free \& storage director } j \text{ free \& channel } k \text{ busy}).$ In function block 79, for each DASD $i$ and CPU the normalization constant is computed as follows:

$$NORMALIZE_{i,l} = \sum_{\substack{j=1 \\ j \rightarrow HOS_i}}^{NSD} \sum_{\substack{k=1 \\ k \rightarrow j \\ l \rightarrow k}}^{NCHANNEL} [1 - prob_i(\text{path}(k \rightarrow $$

$$j \rightarrow HOS_i)\text{busy})].$$

Then, for each DASD i, head of string $HOS_j$, storage director j satisfying $j \rightarrow HOS_i$, and channel k satisfying $k \rightarrow j$, the probability $prob_i(\text{path}(k \rightarrow j \rightarrow HOS_i)\text{selected})$ is recomputed as follows:

$$\frac{1}{NORMALIZE_{i,CPU_k}} \frac{THRUDASD_{i,CPU_k}}{THRUDASD_i} [1 - prob_1(\text{path}(k \rightarrow $$

$$j \rightarrow HOS_i)\text{busy})].$$

The new value is then compared to the old in decision block 80. If the distance between these two values is greater than $\epsilon_{ITERATE}$ (an internally chosen stopping criteria parameter) for any such DASD and subpath, the process loops back to function block 77; otherwise, the process goes to function block 81 where, for each DASD i, the probability of DASD i experiencing a start I/O (SIO) miss when trying an initial connect is computed as follows:

$prob_i(\text{SIO miss}) =$ $$\prod_{\substack{j=1 \\ j \rightarrow HOS_i}}^{NSD} \prod_{\substack{k=1 \\ k \rightarrow j}}^{NCHANNEL} prob_i(\text{path}(k \rightarrow j \rightarrow HOS_i)\text{busy}).$$

The probability of DASD i experiencing an RPS miss when trying to reconnect is computed as follows:

$prob_i(\text{RPS miss}) = prob_i(\text{SIO miss})$
for the dynamic case (SDSWITCH = 1), and ...
$prob_i(\text{RPS miss}) =$ -continued $$\sum_{\substack{j=1 \\ j \rightarrow HOS_i}}^{NSD} \sum_{\substack{k=1 \\ k \rightarrow j}}^{NCHANNEL} prob_i(\text{path}(k \rightarrow j \rightarrow HOS_i)\text{selected})$$

$prob_i (\text{path}(k \rightarrow j \rightarrow HOS_i)\text{busy})$ for the static case (SDSWITCH = 0).

In function block 82, the average number of SIO retries for DASD i is computed as follows:

$$SIORETRIES_i = \frac{prob_i(\text{SIO miss})}{1 - prob_i(\text{SIO miss})}.$$

Given channel k, the total utilization due to data transfer from all DASDs is computed as follows:

$TUTIL_k =$ $$\sum_{\substack{j=1 \\ k \rightarrow j}}^{NSD} \sum_{\substack{i=1 \\ j \rightarrow HOS_i}}^{NDASD} UTRANSCH_i prob_i(\text{path}(k \rightarrow j \rightarrow HOS_i)\text{selected}).$$

For this channel k, the total throughput from all DASDs is computed as follows:

$TTHRU_k =$ $$\sum_{\substack{j=1 \\ k \rightarrow j}}^{NSD} \sum_{\substack{i=1 \\ j \rightarrow HOS_i}}^{NDASD} TTHRUDASD_i prob_i (\text{path}(k \rightarrow j \rightarrow HOS_i)\text{selected}).$$

Now, given DASD i, the average service time at the channels to satisfy requests for data from DASD i is determined as follows:

$$SIOTIME_i = \sum_{\substack{k=1 \\ \exists j \in \{1, \ldots, NSD\} | k \rightarrow j \rightarrow HOS_i}}^{NCHANNEL} \frac{TUTIL_k}{TTHRU_k}.$$

Finally, the mean start I/O delay at DASD is computed as follows:

$SIODELAY_i = SIORETRIES_i SIOTIME_i$

In function block 82, the average number of RPS retries for DASD i is computed as follows:

$$RPSRETRIES_i = \frac{prob_i(\text{RPS miss})}{1 - prob_i(\text{RPS miss})} CORRECTOR_i.$$

The mean RPS miss delay at DASD i is computed as follows:

$RPSDELAY_i = RPSRETRIES_i ROTATION_i.$

In function block 84, the mean service time for DAASD i¢CACHE is computed as follows:

$SERVICE_i = SIODELAY_i + SEEK_i +$ $LATENCY_i + RPSDELAY_i + SEARCH_i +$

-continued
$$TRANSFER_i + OVERDASD_{i,1}.$$

The mean service time for DASD i CACHE is computed as follows:

$$SERVICE_i =$$

$$FRACTION_{i,1} \begin{bmatrix} SIODELAY_i + SEEK_i + LATENCY_i + \\ RPSDELAY_i + SEARCH_i + \\ TRANSFER_i + OVERDASD_{i,1} \end{bmatrix} +$$

$$FRACTION_{i,2} \begin{bmatrix} \frac{SIODELAY_i}{2} + \\ SEARCHC_i + TRANSFERC_i \end{bmatrix} +$$

$$\sum_{j=3}^{5} FRACTION_{i,j} \begin{bmatrix} SIODELAY_i + SEEK_i + LATENCY_i + \\ RPSDELAY_i + SEARCH_i + \\ TRANSFER_i + OVERDASD_{i,j} \end{bmatrix}$$

Finally, in function block 85, given these service times, the response times $RESPONSE_i$ for each DASD i using the formulae for open, multi-class, product-form queuing networks. The mean I/O subsystem response time is computed by averaging over all DASDs, as follows:

$$IORESPONSE = \sum_{i=1}^{NDASD} RESPONSE_i \frac{TTHRUDASD_i}{TTHRUPUT}.$$

Micro Model Inputs

The input parameters to the micro model can be grouped into several categories, as follows:

General Notation

Let NFILE denote the number of files in the system.
The user may choose either the limited or unlimited file movement option. Let $$ULSWITCH =$$

$$\begin{cases} 0 \text{ if the unlimited file movement option is chosen, and} \\ 1 \text{ if the limited file movement option is chosen.} \end{cases}$$

In the event that the limited file movement option is chosen, let TWEAKLIM denote the maximum number of files which may be moved from their present DASDs.

Macro Model Input

All input parameters except the boundary constraints and the stopping criteria are required.

Macro Model Output and Other DASD Parameters

For each i, i∈{1, ..., NDASD}, and each j, j∈{1, .., NCPU}, let $p_{i,j}$ denote the optimal relative access rates for DASD i and CPU j, as obtained from the macro model. For each such i and j, the various throughput goals are computed as follows:

$$GOAL_{i,j} = p_{i,j} THRUPUT_j.$$

The total throughput goal for each DASD i is computed as follows:

$$TGOAL_i = \sum_{j=1}^{NCPU} GOAL_{i,j}.$$

For each i, i∈{1, ....., NDASD,} let $CAPAC_i$ denote the size capacity of DASD i.

File Parameters

The user may choose to enter mean file access rate data in either a fine (separate means for each CPU required) or coarse (one overall mean required) mode.

$$FCSWITCH = \begin{cases} 0 \text{ if the fine mode is chosen, and} \\ 1 \text{ if the course mode is chosen.} \end{cases}$$

In the event that FCSWITCH=0, let, for each i∈{1, ..., NFILE}, and each j, j∈(1, ...,NCPU}, the variable $ACCESS_{i,j}$ denote the mean access rate for file i and CPU j. The goals will be automatically normalized by the micro model so that $$\sum_{i=1}^{NDASD} GOAL_{i,j} = \sum_{i=1}^{NFILE} ACCESS_{i,j}$$

for each CPU j. The total goals and throughputs will be adjusted accordingly. The total access rate for each file i is computed as follows:

$$TACCESS_i = \sum_{j=1}^{NCPU} ACCESS_{i,j}.$$

In the event that FCSWITCH=1, let, for each i, i∈{1, ...,NFILE}, the variable $TACCESS_i$ denotes the mean access rate for file i. The total goals will be automatically normalized by the micro model so that $$\sum_{i=1}^{NDASD} TGOAL_i = \sum_{i=1}^{NFILE} TACCESS_i.$$

For each i, i∈{1, ... , NFILE}, let $TACCESS95_i$ denote the 95th percentile access rate for file i over all CPUs.

Let CONSTANT denote the multiplicative constant used in the burstiness constraint. This constant assures that no DASDs are overloaded with large numbers of excessively bursty files.

For each i, i∈{1, ... , NFILE), let $SIZE_i$ denote the size of file i.

In the event that the limited file movement option is chosen, let, for each i, i∈{1, ... , NFILE}, $OASSIGN_i = j \in \{1, ... , NDASD\}$ denote that DASD j to which the file i is currently assigned.

The user inputs the set $$ON = \{(i,j) \in \{1, ..., NFILE\} \times \{1, ..., NDASD\} | \text{file } i \text{ must reside on DASD } j\}$$

and the set $$OFF = \{(i,j) \in \{1, ..., NFILE\} \times \{1, ..., NDASD\} | \text{file } i \text{ cannot reside on DASD } j\}.$$

Stopping Criteria

The stopping criteria are determined by the input of $\epsilon_{BLPM}$ according to the following rule: If OPTIMAL denotes the mean I/O subsystem response time computed by the QNM for the optimal DASD relative access rates is determined by the macro model, and IORESPONSE denotes the mean I/O subsystem response time computed by the QNM for the current file assignment at one of the checkpoints, then stop whenever $|OPTIMAL - IORESPONSE| < \epsilon_{BLPM}$.

Binary Linear Programming Model

The BLPM solved by this invention uses the input given above. As output, it gives an optimal assignment of files to DASDs, subject to the constraints imposed. The objective function measures, for each DASD, the distance between the optimal relative access rates as computed by the macro model and the sum of the individual file access rates for files assigned to that DASD, and then sums across all DASDs. Let $ASSIGN_i$ denote the DASD to which file i is assigned. Then, ignoring for the moment the stopping criteria imposed by the QNM, one can write a formal description of the BLPM solved by this invention as follows:

Minimize
$$\sum_{j=1}^{NDASD} \sum_{k=1}^{NCPU} \alpha_{j,k} \text{ (if FCSWITCH = 0)},$$

or $$\sum_{j=1}^{NDASD} \beta_j \text{ (if FCSWITCH = 1)},$$

Such that ...

1. Definition of objective function:

$$\alpha_{j,k} = \left| \sum_{\substack{i=1 \\ ASSIGN_i=j}}^{NFILE} ACCESS_{i,k} - GOAL_{j,k} \right| \text{ for}$$

$$j = 1, \ldots, NDASD \text{ and } k = 1, \ldots, NCPU$$

or $$\beta_j = \left| \sum_{\substack{i=1 \\ ASSIGN_i=j}}^{NFILE} TACCESS_i - TGOAL_j \right| \text{ for}$$

$$j = 1, \ldots, NDASD.$$

2. Performance, availability and ownership (PAO) constraints:

$ASSIGN_i \neq j \text{ if}(i,j)\epsilon OFF$ and $ASSIGN_i = j \text{ if}(i,j)\epsilon ON$.

3. Burstiness constraint:

$$\sum_{\substack{i=1 \\ ASSIGN_i=j}}^{NFILE} TACCESS95_i \leq CONSTANT\ TGOAL_j \text{ for}$$

$$j = 1, \ldots, NDASD.$$

4. Capacity constraint:

$$\sum_{\substack{i=1 \\ ASSIGN_i=j}}^{NFILE} SIZE_i \leq CAPAC_j \text{ for } j = 1, \ldots, NDASD.$$

5. Limited file movement constraint (for ULSWITCH = 1):

$card\{i | ASSIGN_i \neq OASSIGN_i\} \leq TWEAKLIM$.

Notation: Set ...

$FEAS_1$ = {assignments satisfying PAO constraints}, $FEAS_2 = FEAS_1 \cap$ {assignments satisfying burstiness constraint}, and $FEAS_3 = FEAS_2 \cap$ {assignments satisfying capacity constraint}.

Thus, $FEAS_3$ represents the set of totally feasible assignments. Recall that the plus function rom the real numbers to the real numbers is defined by $X+ = max(X,0)$. For a given assignment ASSIGN, define ...

$$INFEAS_1 = \sum_{j=1}^{NDASD} \left[ \sum_{\substack{i=1 \\ ASSIGN_i=j}}^{NFILE} ACCESS95_i - CONSTANT\ GOAL_j \right]^+,$$

$$INFEAS_2 = \sum_{j=1}^{NDASD} \left[ \sum_{\substack{i=1 \\ ASSIGN_i=j}}^{NFILE} SIZE_i - CAPAC_j \right]^+,$$

and $$OBJECT = \sum_{j=1}^{NDASD} \alpha_j.$$

An assignment will be feasible with respect to the burstiness constraint when $INFEAS_1 = 0$. An assignment will be feasible with respect to the capacity constraint when $INFEAS_2 = 0$. A feasible assignment will be optimal when OBJECT is as small as possible.

In the discussions below, JLIMIT is an internally chosen stopping criteria constant, while the values of $CHECK_j$ are internally chosen checkpoints.

The basic approach for the unlimited file movement case is as follows: First, choose a fast, but reasonably good starting assignment of files to DASDs. The method used is a generalization of the so-called "greedy" algorithm. An assignment chosen in this manner will respect the PAO constraints, but will not, in general, be feasible with respect to the burstiness or capacity constraints. Then try, in turn, to remove the burstiness infeasibility, to remove the capacity infeasibility, and finally (if all infeasibilities have been successfully removed) to minimize the objective function. All three tasks involve essentially the same algorithm: Impose a finite nested sequence of increasing neighborhoods $M_i$ surrounding any given point in the space of file assignments. Then, given an assignment, search the first neighborhood in its sequence for an improved assignment. When removing the burstiness infeasibility, this means an assignment which satisfies the PAO constraints while having less burstiness infeasibility. When removing the capacity infeasibility, this means an assignment which satisfies the PAO and burstiness constraints while having less capacity infeasibility. When minimizing the objective function, this means a (totally) feasible assignment which has an improved objective function. If an improved assignment cannot be found, then expand the search to the second neighborhood in the sequence, then the next, and so on. This is the reason for the "neighborhood escape" terminology. For further details on neighborhood escape algorithms see, for example, R. S. Garfinkel and G. L. Nemhauser, *Integer Programming*, John Wiley and Sons (1972). Eventually, an improvement is found, and the entire process is repeated for the new assignment, or one runs out of neighborhoods to search. This latter case represents a failure. If it occurs while trying to remove infeasibility, then one can go back and pick a new starting point. During the search process for minimizing the objective function, the QNM is called at a number of checkpoints, and the algorithm terminates if the assignment gives acceptable results.

For the limited file movement case, pretty much the same approach is used, with three exceptions. First, use the existing file to DASD assignment as a starting point. Second, insist that the improved assignment actually correspond to a strict optimum within the current neighborhood. Third, use the number of files reassigned as an additional stopping point criteria.

One novel aspect of the algorithm is a careful mathematical analysis which proves that certain portions of the neighborhood search cannot yield improvement. The resulting elimination of fruitless searches greatly improves the speed of the BLPM algorithm.

Figure 8:
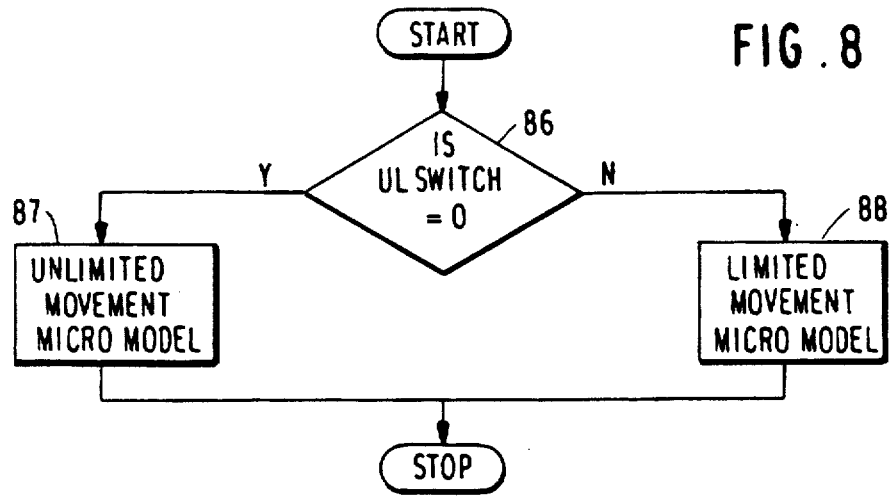
FIG. 8 is a flow diagram of the Binary Linear Programming Model (BLPM) according to the invention.

FIG. 8 shows an overview of the BLPM. In decision block 86, the choice is made between the unlimited movement micro model 87 and the limited movement micro model 88. The unlimited movement micro model is illustrated in more detail in Figure 9, and the limited movement micro model is illustrated in more detail in FIG. 10.

Figure 9:
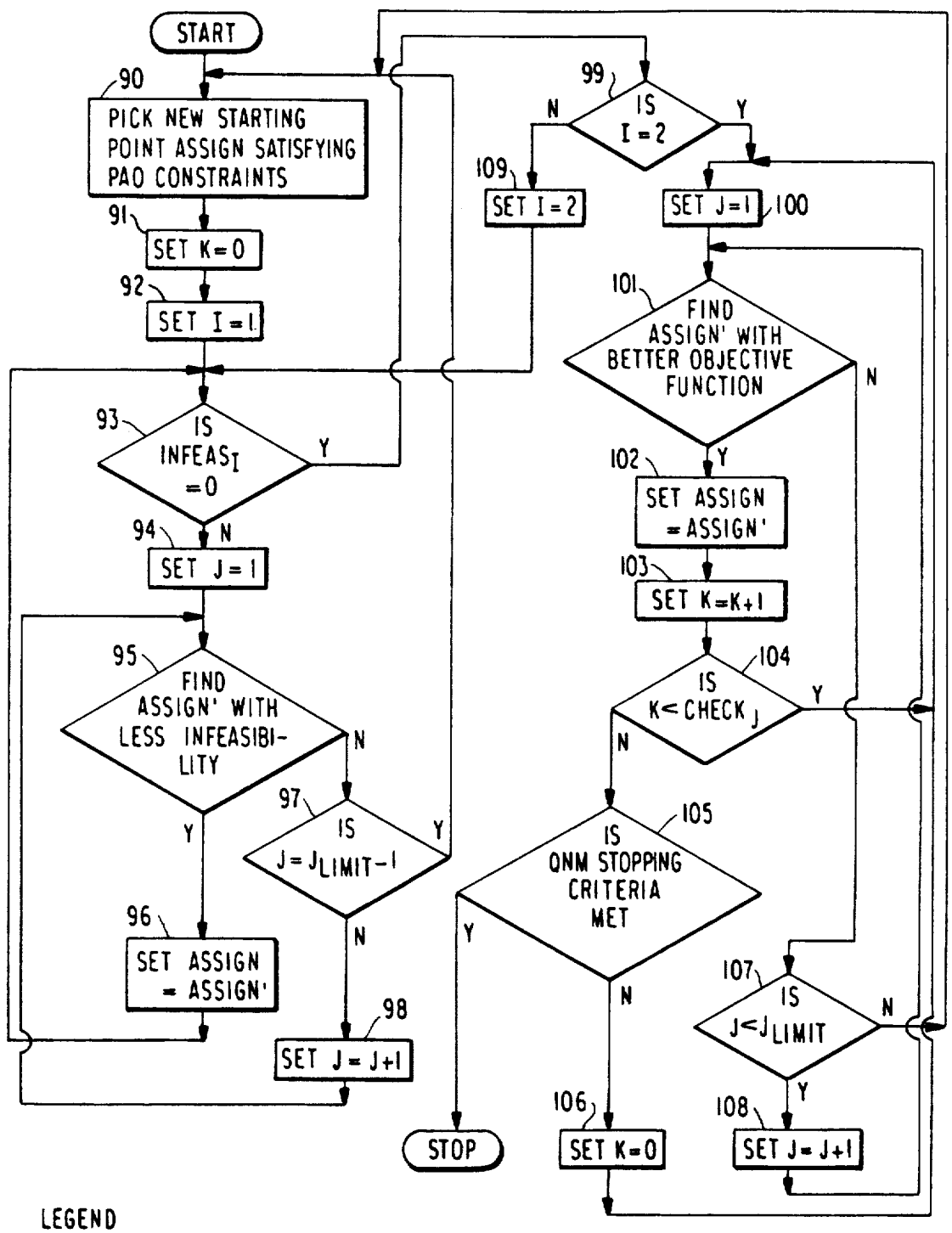
FIG. 9 is a flow diagram of the unlimited movement micro model according to the invention.

Referring now to FIG. 9, the first step in the unlimited movement micro model is function block 90 where a new starting point assignment, ASSIGN, is picked to satisfy PAO constraints. k is set equal to 0 in function block 91, and i is set equal to 1 in function block 92 to initialize the process. Then in decision block 93, if INFEAS$_i$(ASSIGN)=0, control goes to decision block 99; otherwise, j is set equal to 1 in function block 94, and control goes to decision block 95. In decision block 95, an attempt is made to find $$ASSIGN' \epsilon FEAS_i \cap M_j(ASSIGN) \text{ with}$$
$$INFEAS_i(ASSIGN') < INFEAS_i(ASSIGN).$$

If this is possible control to decision block 97; otherwise, ASSIGN is set equal to ASSIGN' in function block 96 and control loops back to decision block 93. If the test in decision block 95 is negative, a test is made in decision block 97 to determine if j is equal to JLIMIT-1. If so, the process loops back to function block 90; otherwise, j is set equal to j+1 in function block 98, and control loops back to decision block 95.

Going now to decision block 99, if the test there is positive, j is set equal to 1 in function block 100. Then, in decision block 101 an attempt is made to find $$ASSIGN' \epsilon FEAS_i \cap M_j(ASSIGN) \text{ with}$$
$$OBJECT(ASSIGN') < OBJECT(ASSIGN).$$

If this is not possible control goes to decision block 107; otherwise, ASSIGN is set equal to ASSIGN' in function block 102, and k is set equal to k+1 in function block 103. A test is then made in decision block 104 to determine if k<CHECK$_j$. If so, the process loops back to function block 100; otherwise, a test is made in decision block 105 to determine if the QNM stopping criteria are met. If so, the process stops; otherwise, k is set equal to 0 in function block 106, and the process loops back to function block 100.

If the test in decision block 101 is negative, a test is made in decision block 107 to determine if j=JLIMIT. If so, the process loops back to function block 90; otherwise, j is set equal to j+1 in function block 108, and the process loops back to decision block 101.

Returning briefly to decision block 99, if the test made there is negative is negative, i is set equal to 2, and the process loops back to decision block 93.

Figure 10:
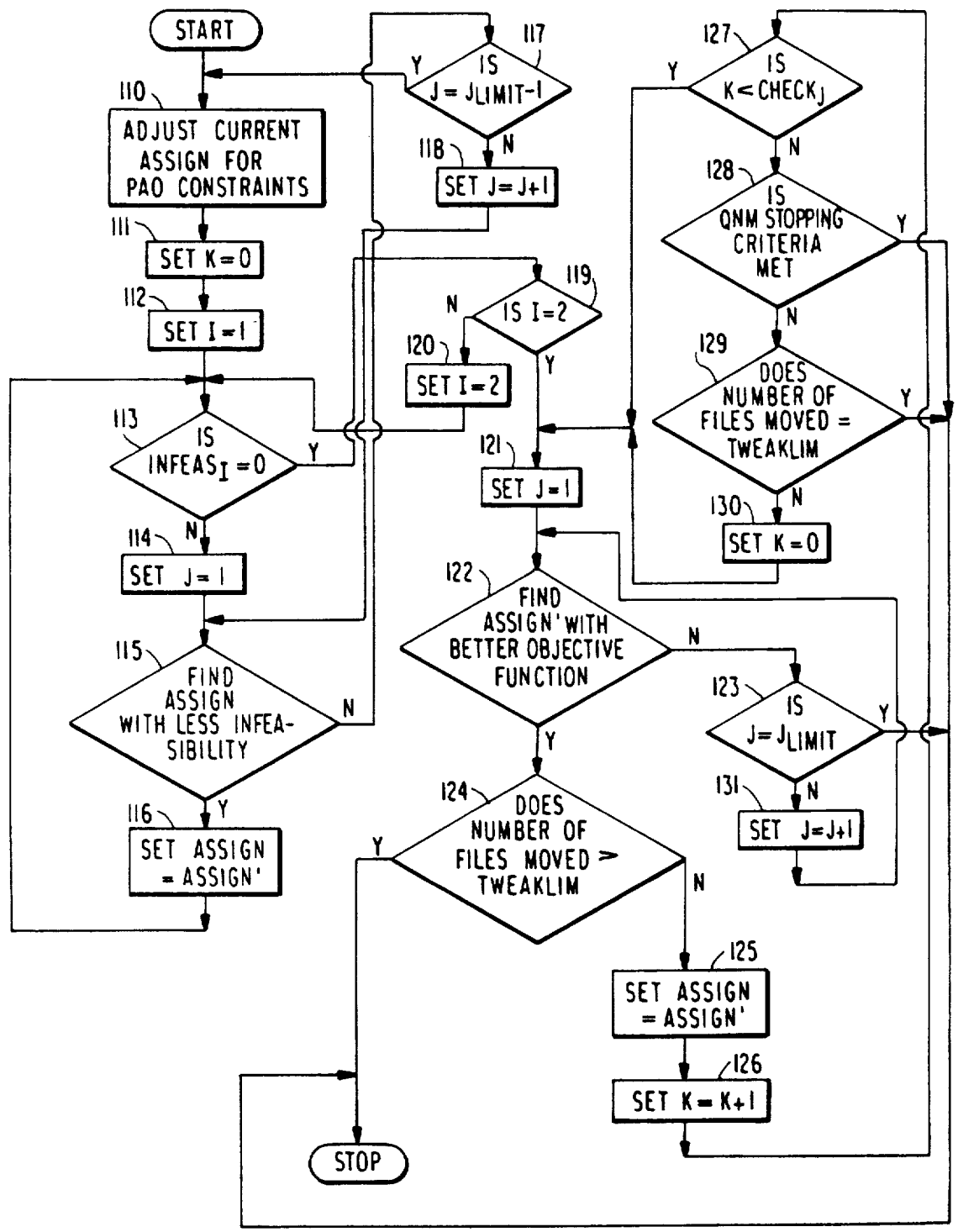
FIG. 10 is a flow diagram of the limited movement micro model according to the invention.

Turning now to the limited movement micro model shown in FIG. 10, the first step in the process is to start with the current assignment, ASSIGN. Any files which do not meet PAO constraints are reassigned, as indicated by function block 110, and then in function block 111, k is set equal to 0 and, in function block 112, i is set equal to 1 to initialize the process. A test is then made in decision block 113 to determine if INFEAS$_i$(ASSIGN) is equal to 0. If so, control goes to decision block 119; otherwise, j is set equal to 1 in function block 114, and an attempt is made in decision block 115 to find a strict neighborhood $$ASSIGN' \epsilon FEAS_i \cap M_j(ASSIGN) \text{ with}$$
$$INFEAS_i(ASSIGN') < INFEAS_i(ASSIGN).$$

If this is no possible, control goes to decision block 117; otherwise, ASSIGN is set equal to ASSIGN' in function block 116, and the process loops back to decision block 113.

In decision block 117, a test is made to determine if j is equal to JLIMIT − 1. If so, the process loops back to function block 110; otherwise, j is set to j+1 in function block 118, and control goes to decision block 115.

A positive test result in decision block 113 passes control to decision block 119 where a test is made to determine if i is equal to 2. If so, control goes to function block 121; otherwise, i is set equal to 2 in function block 120, and the process loops back to decision block 113. In function block 121, j is set equal to 1. Then in decision block 122, an attempt is made to find a strict neighborhood $$ASSIGN' \epsilon FEAS_i \cap M_j(ASSIGN) \text{ with}$$
$$OBJECT(ASSIGN') < OBJECT(ASSIGN).$$

If this is not possible, control goes to decision block 123; otherwise, a test is made in decision block 124 to determine if the number of files reassigned from their DASDs in the initial assignment exceeds TWEAKLIM. If so, the process stops; otherwise, ASSIGN is set equal to ASSIGN' in function block 125, and k is set to k+1 in function block 126. A test is then made in decision block 127 to determine if k<CHECK$_j$. If so, the process loops back to function block 121; otherwise, a test is made in decision block 128 to determine if the QNM criteria are met. If so, the process stops; otherwise, a test is made in decision block 129 to determine if the number of files reassigned from their DASDs in the initial assignment equals TWEAKLIM. If so, the process stops; otherwise, k is set equal to 0 in function block 130, and the process loops back to function block 121.

If the test in decision block 122 is negative, a test is made in decision block 123 to determine if j=JLIMIT. If so, the process stops; otherwise, j is set equal to j+1 in function block 131, and the process loops back to decision block 122.

While the invention has been described in terms of a single preferred embodiment, those skilled in the art will understand that the invention can be practiced, with modification, within the spirit and scope of the appended claims.

Having thus described my invention, what I claim as new and desire to secure by letters patent is as follows:

1. In a data processing system having one or more central processing units and a plurality of direct access storage devices, said direct access storage devices being grouped in a plurality of collections with the direct access storage devices in each collection being connected serially to a respective one of a plurality of head of strings, said head of strings each being attached to one or more storage directors of a controller, said storage directors each being attached to one or more channels which are, in turn, connected to one of said central processing units, said channels, storage directors, head of strings and direct access storage devices constituting a computer input/output subsystem a method performed by said data processing system for improving the performance of said computer input/output subsystem, said method including a macro model and a micro model and comprising steps of:
    inputing to a non-linear programming model configuration and performance characteristics of said data processing system down through the direct access storage device level;
    based on the data processing system configuration and using the non-linear programming model, determining optimal relative access rates of said direct access storage devices, said optimal relative access rates being evaluated by using a queuing network model, said inputing and determining steps comprising said macro model;
    using said macro model only on initial configuration or reconfiguration of said data processing system;
    using a binary linear programming model, measuring for each direct access storage device the distance between the optimal relative access rates as determined by said macro model and the sum of individual file access rates for data files assigned to that direct access storage device, and then summing measured distances for each direct access storage device across all direct access storage devices in the data processing system, said measuring and summing steps comprising said micro model;
    using said micro model on a periodic basis to maintain optimal performance of said input/output subsystems; and
    assigning filed to the direct access storage devices based on the results of said measuring and summing steps.

2. The method recited in claim 1 wherein said binary linear programming model is solved by a "neighborhood escape" type heuristic and said micro model has unlimited and limited modes, further comprising the steps of:
    moving files stored on said direct access storage devices without restriction when using said micro model in the unlimited mode; and
    moving only a limited number of files stored on said direct access storage devices when using said micro model in the limited mode, said limited number being specified by a user of the data processing system.

3. The method recited in claim 2 wherein file movement in said unlimited mode is performed by the following steps:
    choosing a starting assignment of files to direct access storage devices;
    attempting to remove burstiness and capacity infeasibilities; and
    if all infeasibilities have been successfully removed, testing a resulting assignment to determine if it is improved over said starting assignment.

4. The method recited in claim 3 wherein in the steps of attempting to remove burstiness and capacity infeasibilities comprises the steps of:
    imposing a finite nested sequence of increasing neighborhoods about points in the space of file assignments;
    then, given an assignment, searching a first neighborhood in its sequence for an improved assignment which, for removing the burstiness infeasibility, is an assignment that satisfies performance and availability constraints of the DASDs, for removing the capacity infeasibility, is an assignment which satisfies the performance and availability constraints and burstiness constraints while having less capacity infeasibility; and
    if an improved assignment cannot be found, expanding the search to a second neighborhood in the sequence, and then a next neighborhood, until an improvement is found or until the neighborhoods of the nested sequence are exhausted.

5. The method recited in claim 2 wherein file movement in said limited mode is performed by the following steps:
    choosing as a starting assignment of files to direct access storage devices an existing file to direct access storage device assignment;
    attempting to remove burstiness and capacity infeasibilities, and if all infeasibilities have been successfully removed, using said queuing network model by limiting the search to a current neighborhood; and
    using the number of files reassigned as a stopping point criteria.

6. The method recited in claim 5 wherein the steps of attempting to remove burstiness and capacity infeasibilities comprises the steps of:
    imposing a finite nested sequence of increasing neighborhoods about points in the space file assignments; and
    the, given an assignment, searching a first neighborhood in its sequence for an improved assignment which, for removing the burstiness infeasibility, is an assignment that satisfies performance and availability constraints of the DASDs, for removing the capacity infeasibility, is an assignment which satisfies the performance and availability constraints and burstiness constraints while having less capacity infeasibility.

* * * * *